(12) United States Patent
Harres (10) Patent No.: US 7,030,975 B2
(45) Date of Patent: Apr. 18, 2006

(54) MIXER-BASED IN-SERVICE TIME DOMAIN REFLECTOMETER APPARATUS AND METHODS

(75) Inventor: Daniel N. Harres, Belleville, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/845,398

(22) Filed: May 13, 2004

(65) Prior Publication Data

US 2005/0254038 A1 Nov. 17, 2005

(51) Int. Cl.
*G01N 21/00* (2006.01)

(52) U.S. Cl. .................................................. 356/73.1

(58) Field of Classification Search ............... 356/73.1; 398/1–34; 250/559.04–559.08; 385/12–24, 385/123–128
See application file for complete search history.

(56) References Cited

U.S. PATENT DOCUMENTS

| | | | |
|---|---|---|---|
| 5,093,568 A | | 3/1992 | Maycock |
| 5,450,191 A | | 9/1995 | Parks et al. |
| 5,479,251 A | | 12/1995 | Hanson |
| 5,995,255 A | * | 11/1999 | Giles ........................... 398/34 |
| 6,046,797 A | | 4/2000 | Spencer et al. |
| 6,317,535 B1 | | 11/2001 | Jennings et al. |
| 6,381,010 B1 | | 4/2002 | Piffaretti |
| 6,456,370 B1 | | 9/2002 | Ingles, Jr. |
| 6,519,026 B1 | | 2/2003 | Holland |
| 6,577,385 B1 | | 6/2003 | Sakamoto et al. |
| 6,674,518 B1 | | 1/2004 | Asher et al. |
| 6,700,655 B1 | * | 3/2004 | Uchiyama et al. ......... 356/73.1 |
| 6,724,469 B1 | | 4/2004 | Leblanc |

OTHER PUBLICATIONS

Jensen et al., *A Broadband 10-GHz Track-and-Hold in Si/SiGe HBT Technology*, IEEE J. of Solid-State Circuits, vol. 36, No. 3, Mar. 2001.

* cited by examiner

*Primary Examiner*—Tu T. Nguyen
(74) *Attorney, Agent, or Firm*—Black Lowe & Graham, PLLC (57) ABSTRACT

Apparatus and methods for improved fiber optic signal transmission systems are disclosed. In one embodiment, a reflectometer includes an optical source to emit optical energy into a the fiber optic line and to generate time-delayed signals from the repetitive pulses, an optical receiver to detect reflected energy from the fiber optic line and generate reflected signals from the reflected energy, a mixer that receives the reflected signals and receives the time delayed signals to generate a product waveform from the reflected signals and the time-delayed signals, and a processor that receives the product waveform to process the waveform to generate a value based on the sampled characteristic.

42 Claims, 6 Drawing Sheets

MIXER-BASED IN-SERVICE TIME DOMAIN REFLECTOMETER APPARATUS AND METHODS

FIELD OF THE INVENTION

The present invention relates generally to apparatus and methods for improved fiber optic signal transmission systems, and more specifically to apparatus and methods for monitoring optical characteristics of fiber optic transmission lines.

BACKGROUND OF THE INVENTION

Transmission lines are commonly employed to communicate signals between various portions of an electronic system. For example, coaxial transmission lines, waveguides, and even parallel arrangements of metallic conductors are typically employed as transmission lines in such systems. Increasingly, fiber-optic transmission lines are used instead of conventional metallic transmission lines to communicate signals in electronic systems due to the generally higher noise immunity and lower signal attenuation properties obtainable in such lines. Additionally, fiber-optic transmission lines are generally thinner and lighter than metallic conductors of comparable capacity.

In all systems employing transmission lines, difficulties may arise due to degradation of the line resulting from physical damage, aging, poorly matched and/or damaged connectors, or for other reasons. In practice, difficulties with transmission lines are frequently difficult to detect and diagnose, particularly in electronic systems where only a single terminal end of the transmission line is accessible. Although a number of different methods are available to detect and diagnose transmission line difficulties, one useful and commonly employed method is time domain reflectometry.

Figure 1:
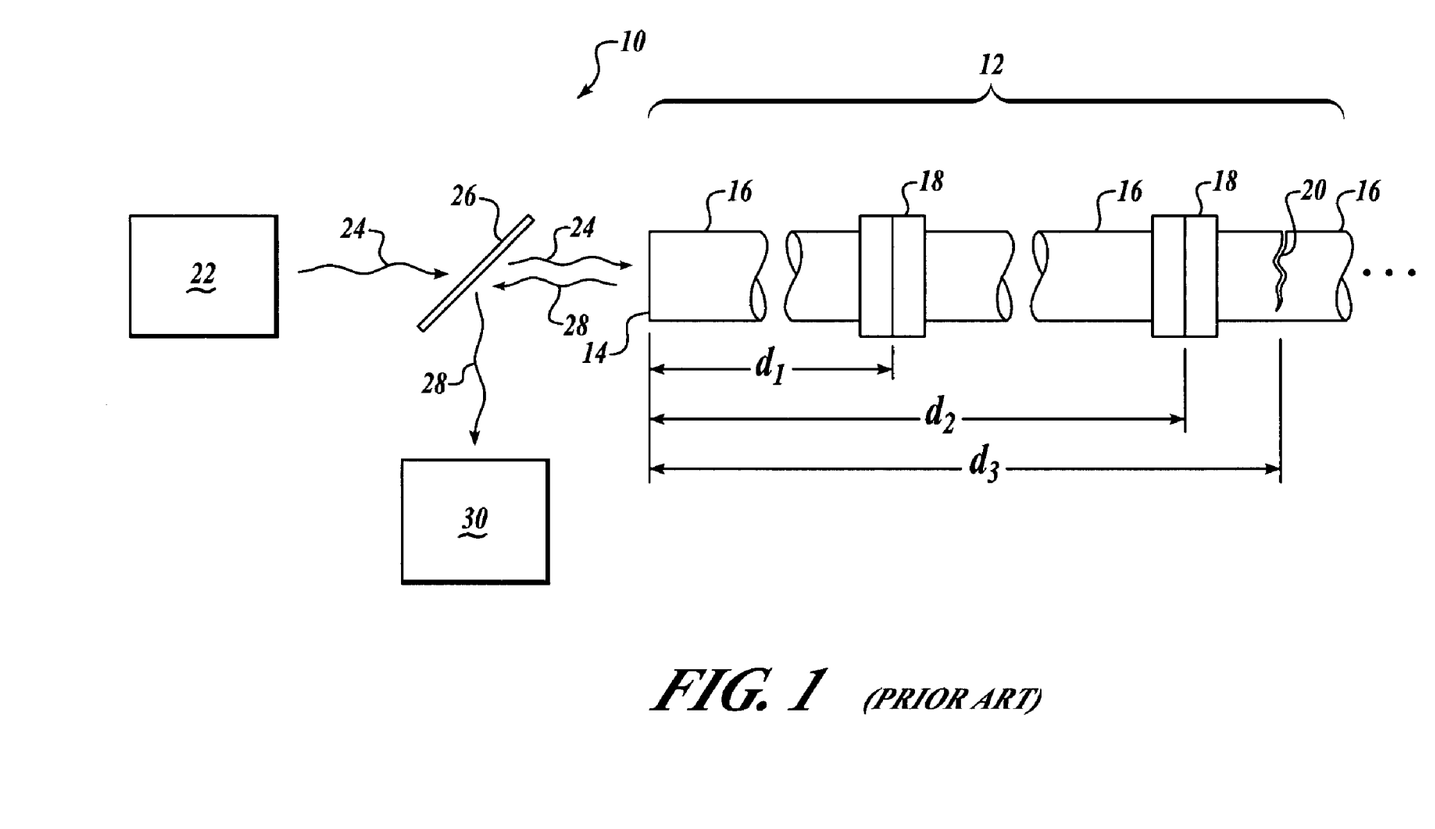
FIG. 1 is a partial elevational and schematic view of a known apparatus that is operable to perform time domain reflectometry on a fiber-optic transmission line assembly.

FIG. 1 is a partial elevational and schematic view of a known apparatus 10 that is operable to perform time domain reflectometry on a fiber-optic transmission line assembly 12. The assembly 12 generally comprises an interconnecting communications element that is configured to communicate electromagnetic signals between various electronic devices (not shown in FIG. 1). The assembly 12 includes a plurality of generally abutting fiber-optic segments 16 that are operatively coupled by one or more connectors 18 positioned at selected locations along a length of the assembly 12. In order to achieve favorable coupling efficiency, the connectors 18 are generally configured to approximately conform to the optical characteristics of the segments 16. Consequently, the connectors 18 typically closely approximate the optical impedance present in the segments 16. Due to defects, damage, or even misalignment of the connectors 18, undesired impedance "bumps" may be present in the fiber-optic transmission line assembly 12 that adversely affect the transmission of optical signals along the assembly 12. The fiber-optic transmission line assembly 12 may further include one or more defects 20 located at various positions along the assembly 12, such as cracks, defective splices, or other similar discontinuities, which may further degrade the optical performance of the assembly 12.

Still referring to FIG. 1, the apparatus 10 will now be described with reference in particular to the detection of optical defects or discontinuities in the assembly 12. The apparatus 10 includes an optical signal source 22 that emits one or more relatively short-duration pulses of optical energy 24 towards a partial mirror 26 that permits at least a portion of the optical energy 24 to be transmitted into a terminal end 14 of the assembly 12, which propagates along the length of the assembly 12. When the optical energy 24 encounters a defect or discontinuity in the assembly 12, reflected energy 28 generally proportional to the magnitude of the impedance mismatch presented by the discontinuity propagates backwardly towards the terminal end 14 of the assembly 12. The reflected energy 28 then emerges from the terminal end 14 and is substantially reflected by the partial mirror 26 and into an optical receiver 30 that is operable to detect the magnitude of the reflected energy 28 and to generate corresponding signals therefrom. The signals may then be communicated to an external recording or viewing device (not shown) to permit defects or discontinuities existing in the assembly 12 to be directly viewed.

Figure 2:
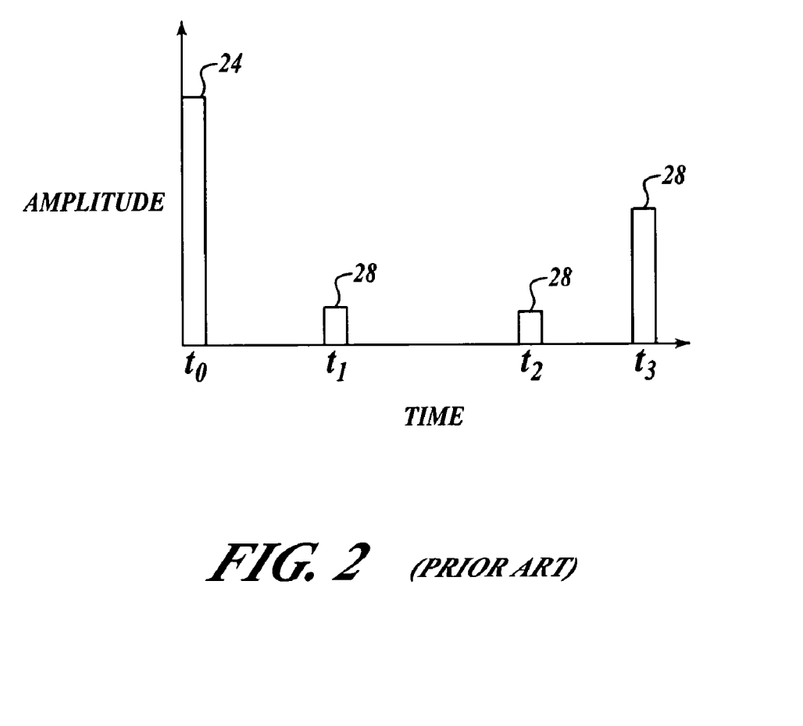
FIG. 2 is a graphical view of the amplitude and time domain behavior of the assembly of FIG. 1 in response to a single pulse of the optical energy.

The operation of the apparatus 10 of FIG. 1 will now be described further with reference to FIG. 2, which shows a graphical view of the amplitude and time domain behavior (or time-series) of the assembly 12 in response to a single pulse of the optical energy 24 applied at a time at an initial time $t_0$. Reflected energy 28 stemming from the single pulse of optical energy 24 is generated at the connectors 18 and the defect 20 and propagates backwardly towards the terminal end 14, and is detected at respective times $t_1$, $t_2$ and $t_3$ by the optical receiver 30. Once the detection times have been determined, the known velocity of propagation for the fiber optic segments 16 may be employed to determine the distances $d_1$, $d_2$ and $d_3$ that correspond to the position of the connectors 18 and the defect 20.

Although desirable results have been achieved using the prior art apparatus, there is room for improvement. For example, the foregoing apparatus 10 may be suitable for a single, or widely-spaced optical pulses, it is less suited for built-in applications that are generally necessary for in-service, or built-in test equipment (BITE) applications in aircraft and the like. What is needed therefore is an apparatus and method for optically monitoring the condition of a fiber-optic assembly that are may be integrated into existing hardware.

SUMMARY OF THE INVENTION

The present invention relates generally to apparatus and methods for improved fiber optic signal transmission systems, and in particular to an optical time domain reflectometer for monitoring optical characteristics of fiber optic transmission lines. In one aspect, the optical time domain reflectometer includes an optical source to repetitively emit optical energy pulses into a terminal portion of the fiber optic transmission line and simultaneously generate time-delayed signals corresponding to the repetitive pulses, an optical receiver to detect reflected optical energy at the terminal portion of the fiber optic transmission line and generate reflected signals from the reflected energy, a mixer that receives the reflected signals and receives the time delayed signals to generate a product waveform from the reflected signals and the time-delayed signals, and a processor that receives the product waveform to process the waveform to generate a value based on the sampled characteristic. In other aspects of the invention, the processor of the reflectometer includes an analog-to-digital converter that receives the product waveform, and a microprocessor coupled to the analog-to-digital converter that receives the digitized product waveform. In still another aspect, the processor includes an integrator that is operable to average the measurements. In still yet another aspect, processor further comprises a power detection unit that is operable to generate a power level value from the product waveform.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates generally to apparatus and methods for monitoring optical characteristics of fiber optic transmission lines, and more particularly, to an optical time domain reflectometer configured to monitor the optical characteristics of fiber optic transmission lines. Many of the specific details of certain embodiments of the invention are set forth in the following description and in FIGS. 3–6 to provide a thorough understanding of such embodiments. One skilled in the art, however, will readily understand that the present invention may have additional embodiments, or that selected elements of the disclosed embodiments may be combined to yield still other embodiments in accordance with the present invention. Alternately, the invention may also be practiced without several of the details described in the following description.

Figure 3:
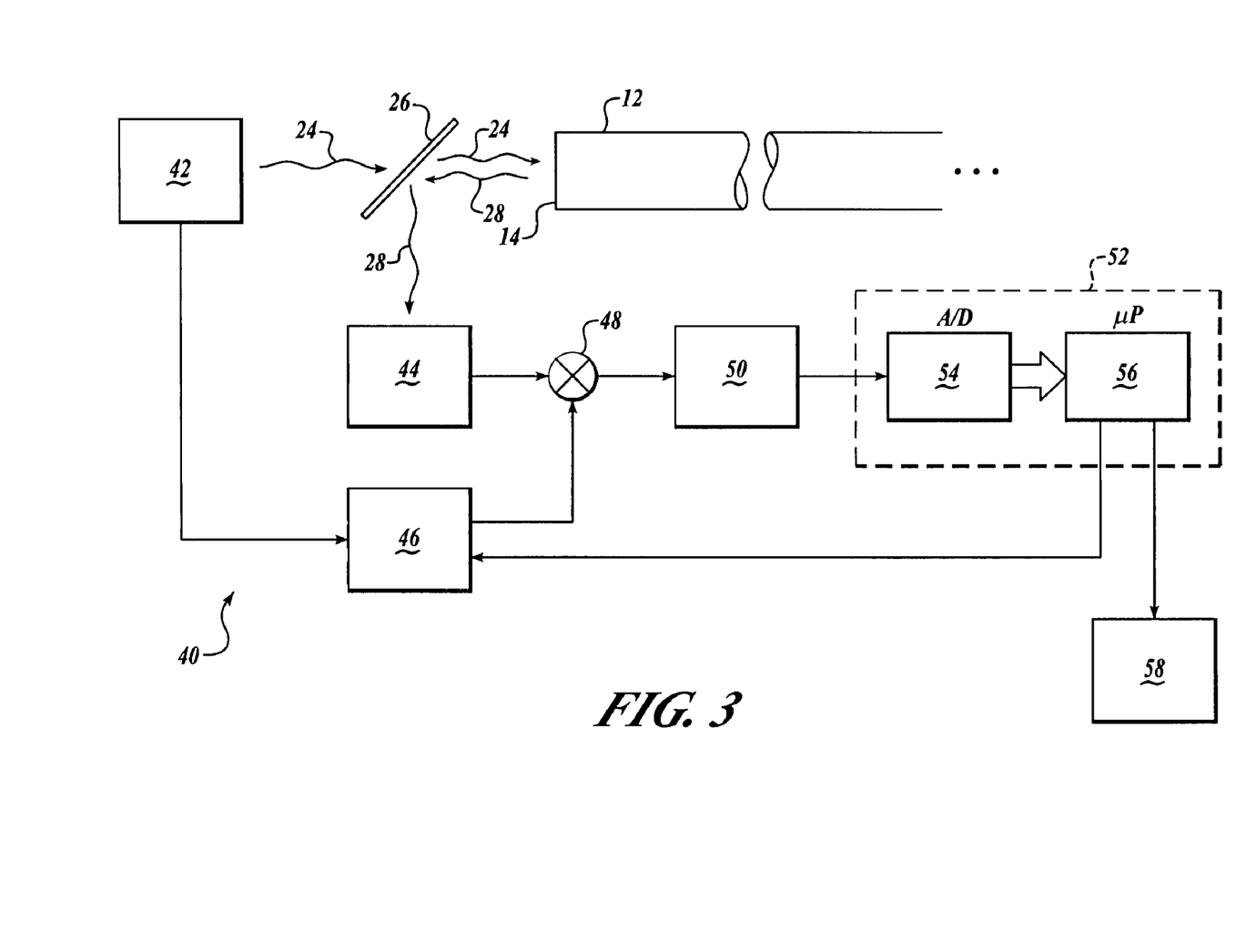
FIG. 3 is a schematic view of an optical time-domain reflectometer according to an embodiment of the invention.

FIG. 3 is a schematic view of an optical time-domain reflectometer 40 according to an embodiment of the invention, which operates in conjunction with the fiber-optic transmission line assembly 12 of FIG. 1. Since various details of the assembly 12 have been fully described previously, in the interest of brevity, will not be described further. It will be appreciated that, in alternate embodiments, optical time-domain reflectometers in accordance with alternate embodiments of the invention may be conceived, and that the invention is not limited to use in association with the particular fiber-optic transmission line assembly 12 shown in FIG. 1.

As shown in FIG. 3, the reflectometer 40 includes an optical signal source 42 capable of repetitively emitting optical energy 24 at one or more selected optical wavelengths and/or pulse repetition frequencies. Accordingly, the signal source 42 may include a photodiode, although other suitable sources of optical radiation exist. Alternately, the source 42 may be a coherent source of optical radiation, such as a laser. In one specific embodiment, the signal source 22 may be a laser diode, or other similar devices. The reflectometer 40 also includes an optical receiver 44 that receives the reflected energy 28 from the fiber-optic transmission line assembly 12. The optical receiver 44 may be comprised of a photodetector suitably positioned within the optical receiver 44 and coupled to electronic circuits operable to convert the received reflected energy 28 into electrical signals that correspond to the reflected energy 28, although other suitable optical detection devices are known.

The reflectometer 40 also includes a variable time delay unit 46 that is coupled to the optical signal source 42 that receives signals corresponding to optical pulses emitted by the source 42 and is configured to time delay the signal by a specified time interval and to provide the time-delayed signal as an output signal. Accordingly, the variable time delay unit 46 may be comprised of a delay line, or other various active analog time delay circuits known in the art. For example, the DS 1010 Silicon Delay Line, available from Dallas Semiconductor, Inc. of Dallas, Tex. may be used, although other suitable variable time delay devices are available. A mixer 48 is coupled to the optical receiver 44 and to the variable delay unit 46. The mixer 48 receives the time-delayed signal from the variable time delay unit 46 and also receives output signals from the optical receiver 44 and heterodynes the received signals to form a product signal from the received signals. Accordingly, the mixer 48 may be a passive mixer device, wherein the excitation energy for the mixer 48 is provided by the input signals from the optical receiver 44 and the variable delay unit 46. Alternately, the mixer 48 may include an active device, wherein the mixer 48 is coupled to a dedicated source of electrical energy, such as a direct current (DC) supply so that the relatively low-level input signals may be amplified. Additionally, the active device may advantageously provide an output signal at an amplified level. In one particular embodiment, the active device is a high performance silicon bipolar device, such as the AD 8343 Active Mixer available from Analog Devices, Inc. of Norwood, Mass., although other suitable alternatives exist.

The optical time domain reflectometer 40 also includes an integrator 50 coupled to the mixer 48 that receives and time-averages the product signals to provide a time-averaged output. In the embodiment shown in FIG. 3, the integrator 50 may include an operational amplifier (OP-AMP) having a capacitor of a predetermined value as a negative feedback element, as is well understood in the art. Alternately, other integrators having different configurations known in the art may also be used.

The optical time domain reflectometer 40 further includes a microcontroller 52 that is configured to receive the time-averaged output signal from the integrator 50. The microcontroller 52 includes an analog-to-digital (A/D) converter 54 that receives the time-averaged output signal from the integrator 50 and converts the signal to a corresponding digital value. The digital value may then be transferred to a microprocessor 56 that performs various control functions, as will be discussed in greater detail below. The microprocessor 56 may also be coupled to an output buffer 58, or other similar storage device that permits information generated by the microcontroller 52 to be accessible by other external circuits. For example, it may be desired to compare the optical performance of the fiber-optic transmission line assembly 12 with a predetermined criterion that reflects acceptable performance of the fiber-optic transmission line assembly 12. Accordingly, the information in the buffer 58 may be read by the other external circuits and compared to the criterion so that a decision regarding acceptable performance of the assembly 12 may be generated. The foregoing comparison and decision regarding acceptable performance of the assembly 12 may also be made within the microprocessor 56.

The operation of the optical time domain reflectometer 40 of FIG. 3 will now be discussed in detail. When the reflectometer 40 is actuated, the optical signal source 42 emits optical energy 24 having a pulse duration of approximately about one nanosecond that are spaced at least approximately about 200 nanoseconds apart, although other pulse-durations and pulse spacing values may also be used. A signal corresponding to the pulse of optical energy 24 is simultaneously communicated to the variable delay unit 46, and an initial time delay value is applied to the signal to time-shift the signal. In one particular embodiment, the time delay value may generally be approximately about 20 nanoseconds, although other time delay values may also be used. After the initial pulse of optical energy 24 is transferred to the fiber optic assembly 12, reflected energy 28 is returned through the terminal end 14 of the assembly 12, and is directed to the optical receiver 44 to generate reflection signals, as previously described. The mixer 48 receives the reflection signals and mixes the signals with the time-delayed signal so that a reflected energy signal waveform is generated.

Since the time delay unit 46 performs a gating function, the reflected energy signals are generated only from the portion of the assembly 12 that corresponds to the selected time delay value. The reflected energy signal waveform is then time averaged by the integrator 50 over the selected time interval and successively repeated for a predetermined number (N) of times to generate an integrated value for the N reflected energy signal waveform determinations. In one particular embodiment, at least about $1 \times 10^6$ waveforms are acquired and summed in the integrator 50, although other larger or smaller values of N may be employed. The integrated value is then transferred to the A/D converter 54 and converted to a corresponding digital value. The microprocessor 56 then receives and stores the digital integrated value, then instructs the time delay unit 46 to increase the time delay value by a predetermined amount, and the foregoing process is repeated again until a time delay value sufficient to sample the entire length of the assembly 12 is reached. The average value obtained may then be communicated to the output buffer 58, where it may be accessed by an external system (not shown) and compared with a criterion that reflects acceptable performance for the assembly 12, as described in greater detail above.

Figure 4:
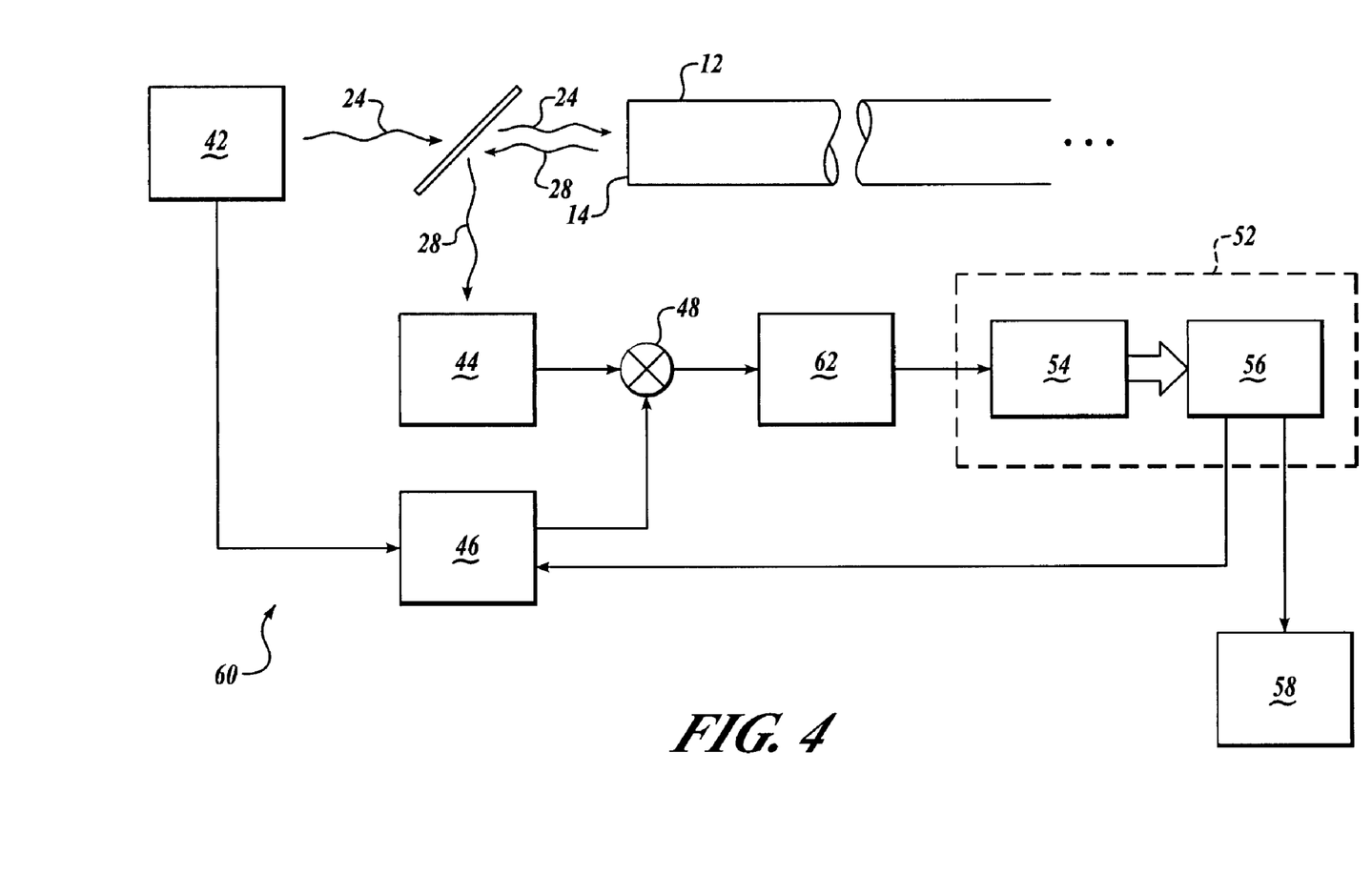
FIG. 4 is a schematic view of an optical time-domain reflectometer according to another embodiment of the invention.

FIG. 4 is a schematic view of an optical time-domain reflectometer 60 according to another embodiment of the invention, which again operates in conjunction with the fiber-optic transmission line assembly 12 of FIG. 1. Many of the details of the present embodiment have been fully described in conjunction with the previous embodiment, and in the interest of brevity, will not be described further. In the present embodiment, the reflectometer 60 includes a radio-frequency (RF) power detection unit 62 that is coupled to the mixer 48 to receive the reflected energy signal waveform information, and generate a DC voltage output corresponding to the power level of the reflected energy signal waveform. Accordingly, the power detection unit 62 may be comprised of any well-known power measurement circuit suitable for the measurement of RF power levels at gigahertz (Ghz) frequencies. The power detection unit 62 thus provides a continuous and generally constant DC voltage corresponding to the power level to the A/D converter 54, so that the power level may be transferred to the microprocessor 56 in digital form. In one particular embodiment, the power detection unit 62 comprises the Analog Devices AD 8362 TRU-PWR Power Detector, available from Analog Devices, Inc. of Norwood, Mass., although other suitable alternatives presently exist.

Figure 5:
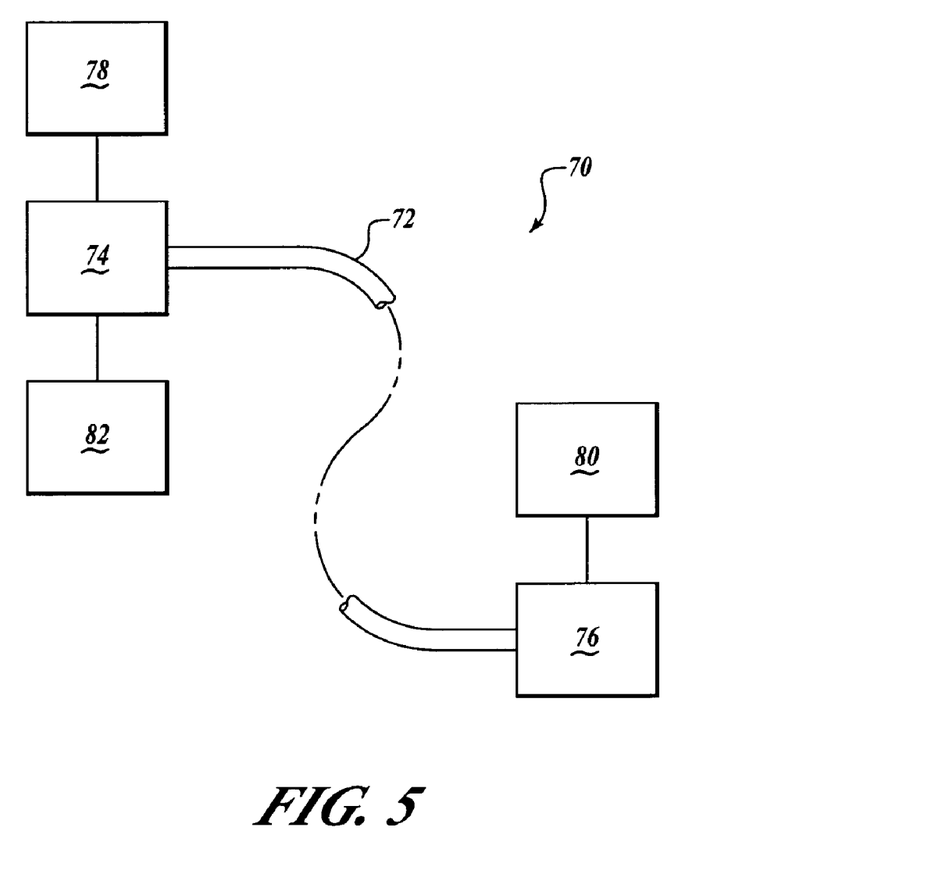
FIG. 5 is a schematic view of a fiber optic communications system according to still another embodiment of the invention.

FIG. 5 is a schematic view of a fiber optic communications system 70 according to still another embodiment of the invention. The system 70 includes a fiber optic transmission line 72 that is operably coupled to a first fiber optic transceiver 74 and a second fiber optic transceiver 76 so that electromagnetic signals may be communicated therebetween. The first transceiver 74 and the second transceiver 76 are also configured to communicate signals to a first electronics package 78 and a second electronics package 80, respectively. The first fiber optic transceiver 74 is further coupled to an optical time domain reflectometer 82 in accordance with the present invention, including, for example, one or more of the previously disclosed embodiments described above. The reflectometer 82 is thus operable to continuously monitor the condition of the fiber optic transmission line 72 in the manner previously disclosed. Alternately, the condition of the fiber optic transmission line 72 may be intermittently monitored by the reflectometer 82 when a test sequence is initiated. For example, where the system 70 comprises a portion of an aircraft system or subsystem, self-initiated test sequences are well known and are used to automatically verify proper operation of the aircraft system or subsystem prior to flight. Alternately, the test sequence may be initiated by a flight crewmember during the operation of the aircraft, or during the performance of a maintenance procedure by ground maintenance personnel. Although FIG. 5 shows the reflectometer 82 coupled to the first fiber optic transceiver 74, one skilled on the art will readily understand that the reflectometer 82 may be alternately coupled to the second fiber optic transceiver 76, or that a reflectometer 82 may be coupled to the first transceiver 74 and the second transceiver 76 to advantageously provide a redundant fiber optic monitoring capability for the system 70.

Figure 6:
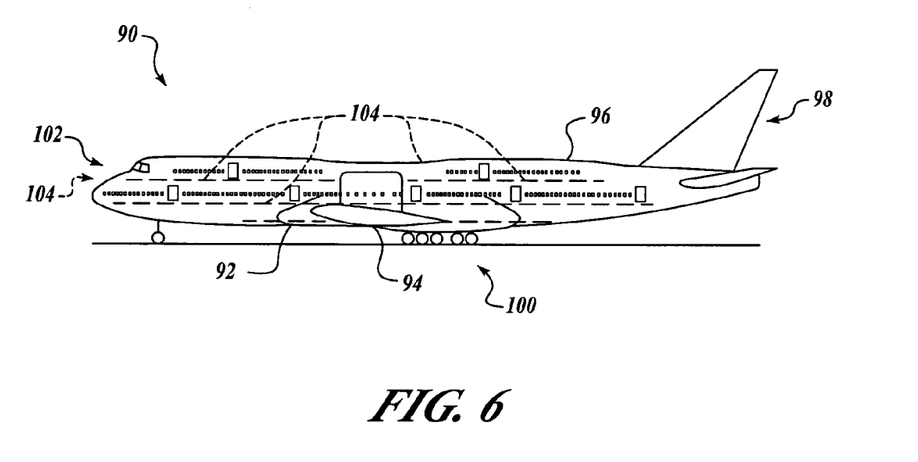
FIG. 6 is a side elevation view of an aircraft having one or more of the disclosed embodiments of the present invention.

Those skilled in the art will also readily recognize that the foregoing embodiments may be incorporated into a wide variety of different systems. Referring now to FIG. 6, a side elevation view of an aircraft 90 having one or more of the disclosed embodiments of the present invention is shown. With the exception of the embodiments according to the present invention, the aircraft 90 includes components and subsystems generally known in the pertinent art, and in the interest of brevity, will not be described further. The aircraft 90 generally includes one or more propulsion units 92 that are coupled to wing assemblies 94, or alternately, to a fuselage 96 or even other portions of the aircraft 90. Additionally, the aircraft 90 also includes a tail assembly 98 and a landing assembly 100 coupled to the fuselage 96. The aircraft 90 further includes other systems and subsystems generally required for the proper operation of the aircraft 90. For example, the aircraft 90 includes a flight control system 102 (not shown in FIG. 6), as well as a plurality of other electrical, mechanical and electromechanical systems that cooperatively perform a variety of tasks necessary for the operation of the aircraft 90. Accordingly, the aircraft 90 is generally representative of a commercial passenger aircraft, which may include, for example, the 737, 747, 757, 767 and 777 commercial passenger aircraft available from the Boeing Company of Chicago, Ill. Although the aircraft 90 shown in FIG. 6 generally shows a commercial passenger aircraft, it is understood that the various embodiments of the present invention may also be incorporated into flight vehicles of other types. Examples of such flight vehicles may include manned or even unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, UK.

With reference still to FIG. 6, the aircraft 90 may include one or more of the embodiments of the optical time domain reflectometer 104 according to the present invention, which may operate in association with the various systems and sub-systems of the aircraft 90. In particular, the various embodiments of the optical reflectometer 104 may perform fault-checking and/or operational monitoring in fiber-optic lines that comprise a portion of the flight control system 102. Although FIG. 6 shows the one or more embodiments of the optical reflectometer 104 as an integral portion of the aircraft 90, one skilled in the art will readily understand that the one or more embodiments of the reflectometer 104 may also be incorporated into a portable test device that may be separately coupled to the various systems and sub-systems of the aircraft 90 in order to perform a ground-based diagnostic analysis on selected fiber-optic systems.

While the preferred embodiments of the invention have been illustrated and described, one skilled in the art will readily recognize that may changes may be made to the disclosed embodiments without departing from the spirit and scope of the present invention. Accordingly, the scope of the invention is not limited by the embodiments disclosed herein. Instead, the invention is to be determined entirely by reference to the following claims.

What is claimed is:

1. An optical time domain reflectometer configured to sample a selected optical characteristic in a fiber optic transmission line, comprising:
    an optical source configured to repetitively emit first optical signals into a terminal portion of the fiber optic transmission line and a time delay unit operable to generate second optical signals suitably time-delayed relative to the first optical signals corresponding to the repetitive emissions;
    an optical receiver configured to detect reflected optical energy at the terminal portion of the fiber optic transmission line and generate reflected signals therefrom;
    a mixer operatively coupled to the optical receiver and to the optical source and adapted to receive the reflected signals and to receive the time delayed second optical signals and to generate a product waveform from the reflected signals and the time-delayed second optical signals; and
    a processor operatively coupled to the mixer that receives the product waveform to process the waveform to generate a value based on the sampled characteristic.

2. The optical time domain reflectometer of claim 1, wherein the processor further comprises an analog-to-digital converter that receives the waveform, and a microprocessor coupled to the analog-to-digital converter that receives the digitized product waveform.

3. The optical time domain reflectometer of claim 1, wherein the processor further comprises an integrator that is operable to integrate the product waveform.

4. The optical time domain reflectometer of claim 1, wherein the processor further comprises a power detection unit that is operable to generate a power level value from the product waveform.

5. The optical time domain reflectometer of claim 1, wherein the processor further comprises an output buffer configured to receive the value based on the sampled characteristic.

6. The optical time domain reflectometer of claim 1, wherein the mixer is a passive mixer.

7. The optical time domain reflectometer of claim 1, wherein the mixer is an active mixer.

8. The optical time domain reflectometer of claim 1, wherein the optical source is a source of coherent radiation.

9. The optical time domain reflectometer of claim 8, wherein the coherent light source is a laser diode.

10. The optical time domain reflectometer of claim 1, wherein the optical receiver is one of a phototransistor and a photodiode.

11. A fiber optic system, comprising:
    a first fiber optic transceiver coupled to a first electronics package;
    a second fiber optic transceiver coupled to a second electronics package;
    a fiber optic transmission line coupled to the first fiber optic transceiver and the second fiber optic transceiver, the fiber optic transmission line operable to communicate signals between the first electronics package and the second electronics package; and
    an optical time domain reflectometer operably coupled to at least one of the first fiber optic transceiver and the second fiber optic transceiver and configured to sample a selected optical characteristic of the fiber optic transmission line, the reflectometer further comprising:
    an optical source configured to repetitively emit first optical signals into a terminal portion of the fiber optic cable and a time delay unit operable to generate second optical signals that are suitably time-delayed relative to the first optical signals corresponding to the repetitive emissions;
    an optical detector configured to detect reflected optical energy at the terminal portion of the fiber optic cable and generate reflected signals therefrom;
    a mixer that receives the reflected signals and receives the time delayed second optical signals to generate a product waveform from the reflected signals and the time-delayed second optical signals; and
    a processor that receives the product waveform and processes the waveform to generate a value based on the sampled characteristic.

12. The fiber optic system of claim 11, wherein the processor further comprises an analog-to-digital converter that receives the waveform, and a microprocessor coupled to the analog-to-digital converter that receives the digitized product waveform.

13. The fiber optic system of claim 11, wherein the processor further comprises an integrator that is operable to integrate the product waveform.

14. The fiber optic system of claim 11, wherein the processor further comprises a power detection unit that is operable to generate a power level value from the product waveform.

15. The fiber optic system of claim 11, wherein the processor is configured to generate a time delay value that is communicated to the time delay unit.

16. The fiber optic system of claim 11, wherein the processor further comprises an output buffer configured to receive the value based on the sampled characteristic.

17. The fiber optic system of claim 11, wherein the mixer is a passive mixer.

18. The fiber optic system of claim 11, wherein the mixer is an active mixer.

19. The fiber optic system of claim 11, wherein the optical source is a source of coherent radiation.

20. The fiber optic system of claim 19, wherein the coherent light source is a laser diode.

21. The fiber optic system of claim 11, wherein the optical detector is a phototransistor.

22. An aerospace vehicle, comprising:
a fuselage;
a propulsion system operatively coupled to the fuselage; and
an optical system at least partially disposed within the fuselage of the vehicle, the optical system comprising:
a fiber optic transmission line operable to communicate electromagnetic signals; and
an optical time domain reflectometer configured to sample a selected optical characteristic of the fiber optic transmission line and generate a value corresponding to the selected optical characteristic, the reflectometer further comprising:
an optical source configured to repetitively emit first optical signals into a terminal portion of the fiber optic transmission line and a time delay unit operable to generate second optical signals suitably time-delayed relative to the first optical signals corresponding to the repetitive emissions;
an optical receiver configured to detect reflected optical energy at the terminal portion of the fiber optic transmission line and generate reflected signals therefrom;
a mixer that receives the electrical signals from the receiver and the time delayed second optical signals from the source to generate a product waveform from the reflected signals and the time delayed second optical signals; and
a processor that receives the product waveform and process the waveform to generate a value based on the sampled characteristic.

23. The aerospace vehicle of claim 22, wherein the processor further comprises an analog-to-digital converter that receives the waveform, and a microprocessor coupled to the analog-to-digital converter that receives the digitized product waveform.

24. The aerospace vehicle of claim 22, wherein the processor further comprises an integrator that is operable to integrate the product waveform.

25. The aerospace vehicle of claim 22, wherein the processor further comprises a power detection unit that is operable to generate a power level value from the product waveform.

26. The aerospace vehicle of claim 22, wherein the processor further comprises an output buffer configured to receive the value based on the sampled characteristic.

27. The aerospace vehicle of claim 22, wherein the mixer is a passive mixer.

28. The aerospace vehicle of claim 22, wherein the mixer is an active mixer.

29. The aerospace vehicle of claim 22, wherein the optical source is a source of coherent radiation.

30. The aerospace vehicle of claim 29, wherein the coherent light source is a laser diode.

31. The aerospace vehicle of claim 22, wherein the optical receiver is one of a phototransistor and a photodiode.

32. The aerospace vehicle of claim 22, further comprising an integrator operably coupled to the mixer that receives the product waveform and generates an integrated value corresponding to the product waveform.

33. The aerospace vehicle of claim 32, further comprising a microcontroller operably coupled to the integrator that receives the integrated value and generates an output value corresponding to the selected optical characteristic of the fiber optic transmission line.

34. The aerospace vehicle of claim 33, wherein the microcontroller is configured to generate a time delay value to suitably time-delay the signals generated by the optical source.

35. The aerospace vehicle of claim 22, further comprising a power detection unit operably coupled to the mixer that receives the product waveform and generates a value corresponding to a power level of the product waveform.

36. The aerospace vehicle of claim 35, further comprising a microcontroller operably coupled to the power detection unit that receives the power level and generates an output value corresponding to the selected optical characteristic of the fiber optic transmission line.

37. The aerospace vehicle of claim 36, wherein the microcontroller is configured to generate a time delay value to suitably time-delay the signals generated by the optical source.

38. The aerospace vehicle of claim 22, wherein the mixer is a passive mixer.

39. The aerospace vehicle of claim 22, wherein the mixer is an active mixer.

40. The aerospace vehicle of claim 22, wherein the coherent light source is a laser diode.

41. The aerospace vehicle of claim 22, wherein the optical receiver is a phototransistor.

42. A method for sampling an optical characteristic in a fiber optic transmission line, comprising:
emitting first optical signals into a terminal portion of the fiber optic transmission line and generating time delayed second optical signals based upon the emitted first optical signals in a time delay unit;
detecting the first optical signals at the terminal portion of the line and generating reflected signals therefrom;
mixing the reflected signals and the delayed second optical signals to form a product waveform; and
processing the product waveform to generate a value based upon the sampled characteristic.

* * * * *

UNITED STATES PATENT AND TRADEMARK OFFICE
CERTIFICATE OF CORRECTION

| | | |
|---|---|---|
| PATENT NO. | : 7,030,975 B2 | Page 1 of 1 |
| APPLICATION NO. | : 10/845398 | |
| DATED | : April 18, 2006 | |
| INVENTOR(S) | : Daniel N. Harres | |

It is certified that error appears in the above-identified patent and that said Letters Patent is hereby corrected as shown below:

Column 1, line 4, add the following paragraph:

STATEMENT OF GOVERNMENT INTEREST

This invention was made with Government support under N00019-04-C-0005 awarded by the United States Navy. The Government has rights in this invention.

Signed and Sealed this

Twenty-ninth Day of August, 2006

JON W. DUDAS
*Director of the United States Patent and Trademark Office*